(No Model.)
P. CHAMBERLIN.
SPECULUM.
No. 380,745. Patented Apr. 10, 1888.
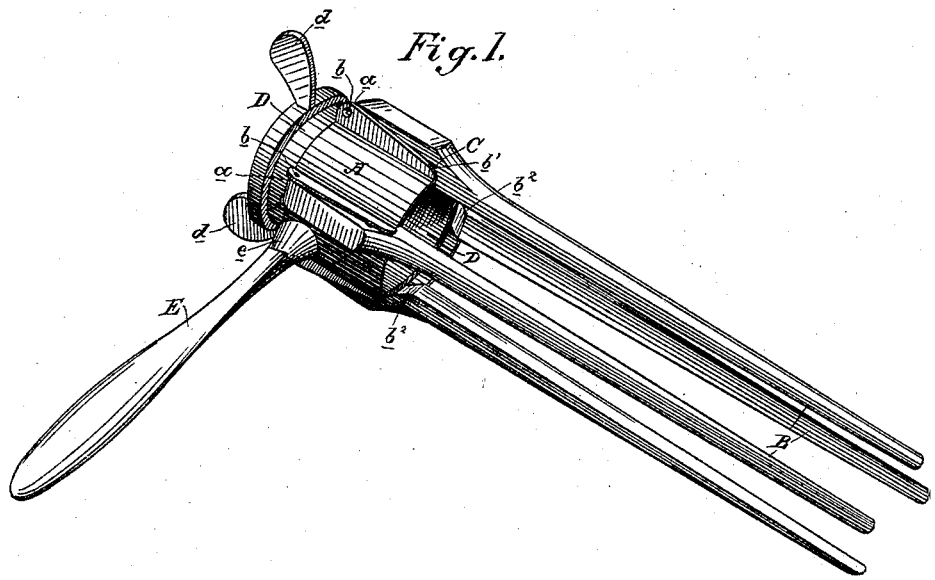
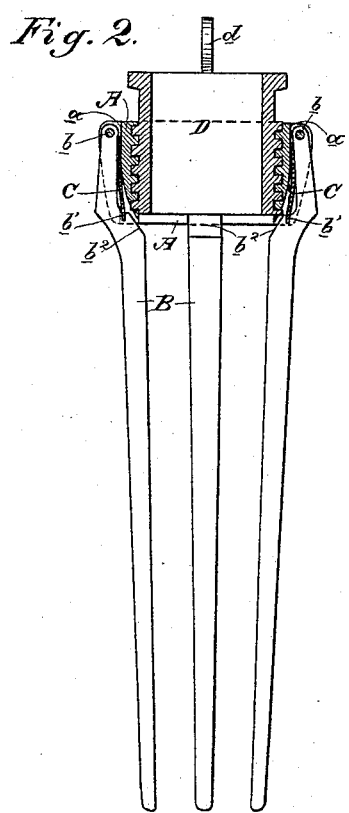

UNITED STATES PATENT OFFICE.

PHILANDER CHAMBERLIN, OF SANTA CRUZ, CALIFORNIA.

SPECULUM.

SPECIFICATION forming part of Letters Patent No. 380,745, dated April 10, 1888.

Application filed December 19, 1887. Serial No. 258,408. (No model.)

*To all whom it may concern:*

Be it known that I, PHILANDER CHAMBERLIN, of Santa Cruz, in the county of Santa Cruz and State of California, have invented an Improvement in Specula; and I hereby declare the following to be a full, clear, and exact description thereof.

My invention relates to that class of surgical instruments termed "specula;" and my invention consists in the combination of the annular hub, the spring-actuated arms pivoted to said hub, and the annular nut operating in the hub and against the spring-arms, whereby they are expanded, all of which I shall hereinafter fully describe.

The object of my invention is to provide a speculum of a simple construction and one which is effective in operation.

Referring to the accompanying drawings, Figure 1 is a perspective view of my speculum. Fig. 2 is a section of same.

A is the hub or stock, made of an annular or ring shape and internally threaded. The hub is provided around its periphery with flanged grooves $a$, which form seats for the arms B, said arms being pivoted at $b$ in the grooves and being affected by springs C, placed under them and engaging a notch, $b'$, in their heads, said springs having a tendency to contract the arms or draw them all toward the center into the least possible compass. I prefer to have the arms B four in number.

D is an annular nut externally threaded to traverse the internally-threaded surface of the hub A and provided with a couple of thumb-wings, $d$, on its rear end, whereby it is readily operated.

The heads of the arms B on their inner surface are provided with inclined planes $b^2$, which project into the area inclosed by the annular hub, and consequently into the path of the travel forward of the nut D, so that as said nut is turned forward in the hub it comes in contact with the inclined planes of the arms and presses said arms outwardly, causing them to diverge and to remain in this divergent position as long as the nut remains in the place to which it is adjusted.

E is the handle of the instrument, which is secured in a suitable socket, $e$, in the side of the hub A.

The operation of the instrument is as follows: The arms in a normal position are contracted by their springs into the least possible compass, and while in this position they are inserted. The nut D is then screwed up, so as to expand the arms and hold them in an expanded condition until the operation is complete.

Having thus described my invention, what I claim as new, and desire to secure by Letters Patent, is—

1. A speculum comprising an annular internally-threaded hub, arms pivoted in said hub, and an annular externally-threaded nut fitting the internally-threaded hub and bearing against the arms, whereby they are expanded, substantially as described.

2. A speculum comprising an annular internally-threaded hub, arms pivoted in the hub, springs affecting said arms, whereby they are normally drawn together or contracted, and an externally-threaded annular nut fitting the internally-threaded hub for operating against the arms and effecting their expansion, substantially as described.

In witness whereof I have hereunto set my hand.

P. CHAMBERLIN.

Witnesses:
 W. B. HARE,
 LEVI MCCOY.